F. J. MILLEA.
SPRING WHEEL.
APPLICATION FILED OCT. 20, 1909.
993,092.
Patented May 23, 1911.
3 SHEETS—SHEET 1.
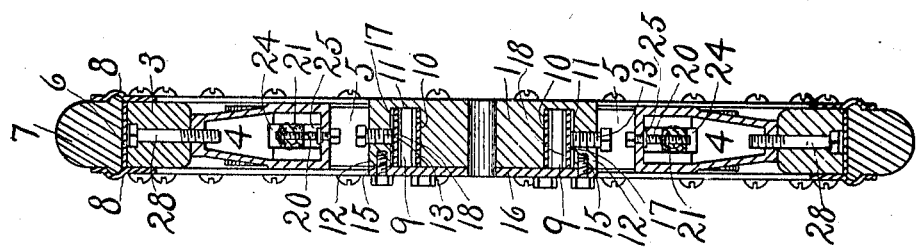
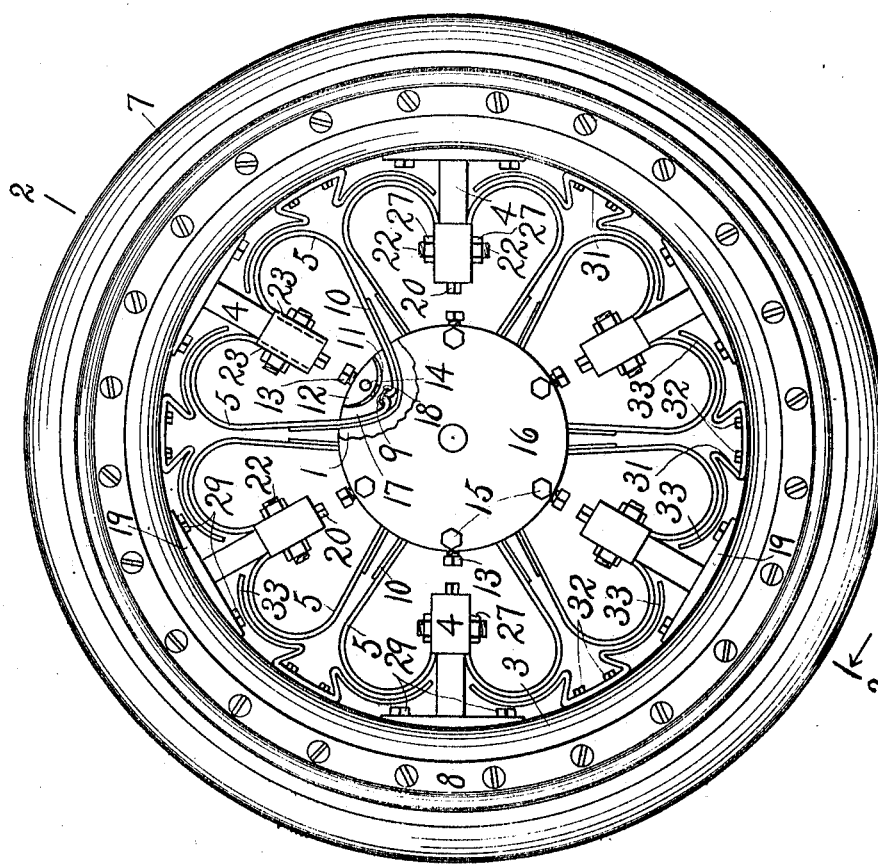
WITNESSES:
A. C. Fairbanks.
J. M. Davenport
INVENTOR.
Francis J. Millea,
BY
Webster & Co.,
ATTORNEYS.

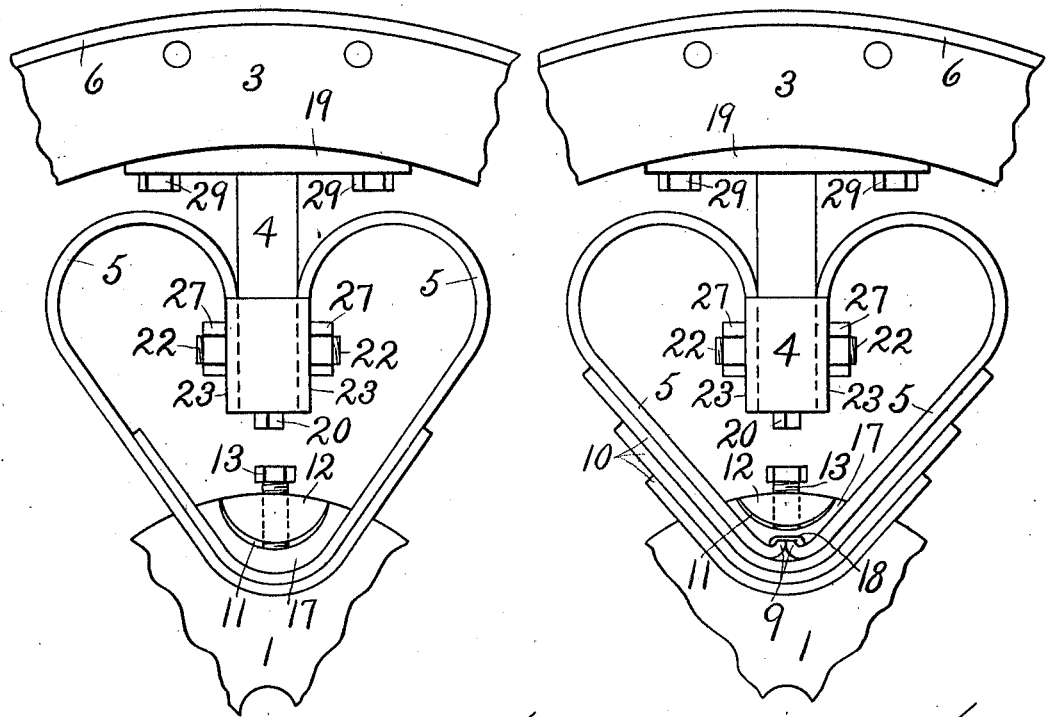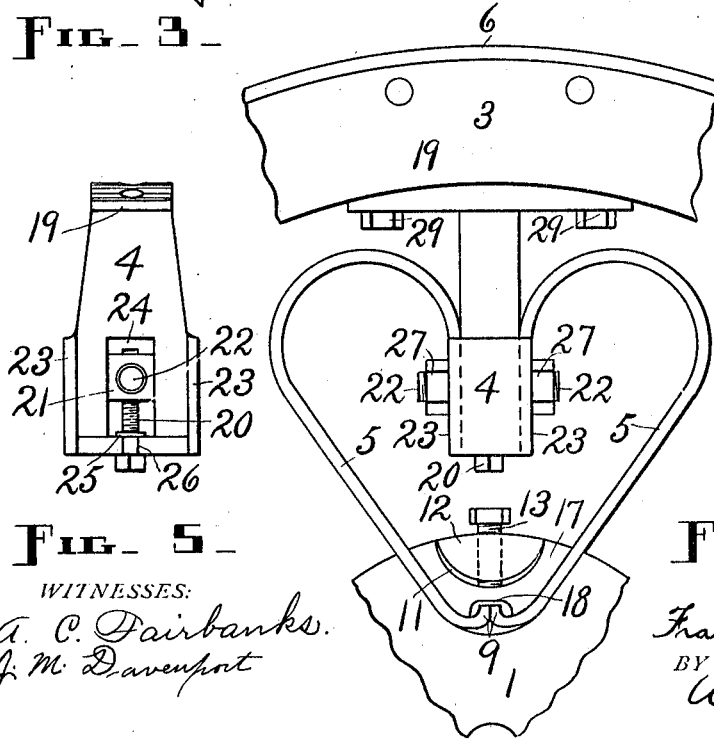

F. J. MILLEA.
SPRING WHEEL.
APPLICATION FILED OCT. 20, 1909.

993,092.

Patented May 23, 1911.

3 SHEETS—SHEET 3.

WITNESSES:
A. C. Fairbanks.
J. M. Davenport

INVENTOR.
Francis J. Millea,
BY
Webster & Co.,
ATTORNEYS.

UNITED STATES PATENT OFFICE.

FRANCIS J. MILLEA, OF SPRINGFIELD, MASSACHUSETTS, ASSIGNOR OF ONE-HALF TO HIMSELF, ONE-FOURTH TO JOHN E. STANNARD, AND ONE-FOURTH TO GEORGE W. D. UPTON.

SPRING-WHEEL.

993,092.  Specification of Letters Patent.  Patented May 23, 1911.

Application filed October 20, 1909. Serial No. 523,671.

*To all whom it may concern:*

Be it known that I, FRANCIS J. MILLEA, a citizen of the United States of America, residing at Springfield, in the county of Hampden and State of Massachusetts, have invented a new and useful Spring-Wheel, of which the following is a specification.

My invention relates to improvements in vehicle wheels upon which solid rubber tires or the like are used in lieu of pneumatic tires, and more especially to improvements in the wheel covered by United States Letters Patent, No. 901,751, of October 20th, 1908, and said invention consists generally of two-part heart-shaped springs which take the place of ordinary spokes, and of certain peculiar means for fastening said springs directly to the hub and indirectly to the felly or rim of the wheel, together with such other parts and members as may be deemed necessary or desirable in order to obtain the best results, all as hereinafter set forth.

The objects of my invention are, first, to produce a strong and durable yet comparatively light and inexpensive wheel of the class noted above, which possesses the principal and most desirable characteristics that are imparted to a wheel of ordinary construction by a pneumatic tire; second, to provide a wheel of this kind that can be readily and cheaply repaired when any of the lighter parts thereof become broken, badly worn, or otherwise injured; third, to furnish means in such a wheel for supporting and relieving the main springs thereof, at their outer terminals where the greatest strain is liable to come when compression of said springs takes place, and so preventing breakage or other injury, and, fourth, to provide a spring wheel which is simple in construction, easy to assemble and take apart, and practicable and efficient for all purposes for which such a wheel is likely to be used, and can be accurately adjusted or trued. I attain these objects by the means illustrated in the accompanying drawing, in which—

Figure 7:
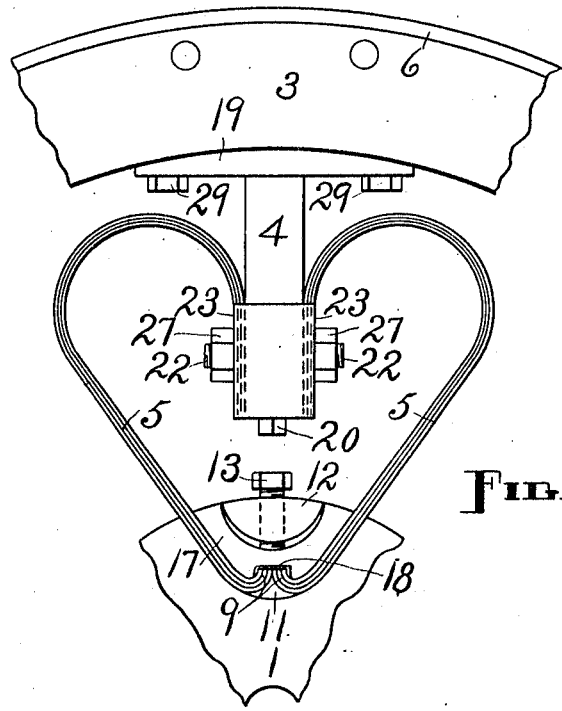

Figure 1 is a side elevation of a wheel which embodies a practical form of my invention, a portion of the hub face-plate being broken away to show how the springs are fastened to the hub; Fig. 2, a section on lines 2—2, looking in the direction of the arrow, in Fig. 1; Fig. 3, an enlarged fragmentary view of a slightly different form of spring from that which appears in the other views; Fig. 4, an enlarged fragmentary view showing additional reinforcement for the springs at the hub; Fig. 5, an enlarged side elevation, as viewed from inside the wheel, of one of the tie brackets for the springs; Fig. 6, an enlarged fragmentary view showing the springs without reinforcement at the hub; Fig. 7, an enlarged fragmentary view showing a plurality of springs in unreinforced two-part heart-shaped spring formation, and, Fig. 8, an enlarged fragmentary view showing still another method of reinforcing.

Similar figures refer to similar parts throughout the several views.

The wheel shown in the drawings comprises a hub 1, a rim 3 provided with a plurality of interior brackets 4 which are radial to the axis of the wheel, a plurality of spring units 5, such units being arranged in pairs of heart-shaped formation securely fastened to said hub and to said brackets, a flat metal tire 6 on said rim, a solid rubber tire 7 on said flat tire, and ring-plates 8—8 secured to the sides of the rim and extending beyond the periphery of the same to hold the rubber tire in place.

The hub 1, the brackets 4, and the spring units 5, together with certain relief-buffers which will be subsequently described, are the new features, while the other parts of the wheel just described are old and well-known in construction and application.

Heart-shaped springs have been found to be eminently satisfactory in wheels that dispense with pneumatic tires, and in order to get what I consider to be the best results from such springs and to increase the facility with which they can be placed in the wheel and therein secured, reinforced when necessary and as necessary, and removed for any cause, I make them in two pieces, excepting in the construction illustrated in Fig. 7 where the spring units consist of more than a single spring each; that is to say, I employ a pair of springs, with the exception just noted, instead of a single spring as in the wheel covered by the patent hereinbefore mentioned, with which to obtain the desired heart-shaped formation. The springs or units 5 in each pair may be arranged so that they abut at the hub ends, in which event I prefer to turn such ends inward to form hooks 9, for the reason presently to be given, or they may be arranged to overlap at the apex end of the heart outline which they form. Since there is considerable wear, strain, and shearing action on the springs at the hub terminals, ample means of reinforcement at and adjacent to such terminals is provided, such means consisting of one or more supplementary or auxiliary springs 10.

Although anchorage devices for the outer terminals of the springs 5 similar to either of those disclosed in the aforesaid patent may be used in this case, I prefer to employ the brackets 4 because, while being simple and affording ready means of attachment for the springs, they also afford an adjustment for said springs which is very advantageous and desirable.

The hub 1 has a plurality of grooves, slots or recesses 11 cut into the same from one side and arranged at regular intervals around said hub, each of such recesses being bowed to conform more or less closely to the shape of each pair of spring units 5 at the inner ends of such units. The recesses 11 are deep enough to receive the units 5, and there are the same number of said recesses as there are pairs of said units. These recesses leave a corresponding number of lugs 12 on the hub, which lugs are tapped radially for bolts 13. The lugs 12 also have holes 14 tapped into their faces to receive bolts 15 by means of which an annular face-plate or disk 16 is attached to the hub to cover said lugs and all parts within the circumference of said hub, so that when said plate is in place both sides of the hub are alike in appearance save for the presence of the heads of said bolts. Segmental or crescent-shaped binding-blocks 17 are employed in the recesses 11 between the parts of the springs 5, and 10 when used, which are in said recesses and the inner ends of the radial bolts 13. The surfaces of the recesses 11 and the binding-blocks 17 that are contiguous to the springs conform, respectively, to the inner and outer outlines of such springs, or rather of what may be termed the hub portions of such springs, especially when said blocks are forced tightly against the springs by screwing in the bolts 13. The inner edge of each binding-block 17 is laterally indented or grooved in the center, as shown at 18, wherever necessary to accommodate the hooks 9 at the inner ends of such springs 5 as have them. In cases where the springs 5 overlap and the hooks 9 are absent the indentations are not needed, although their presence would probably do no harm. The hooks 9 engage or interlock with the recessed parts of the binding-blocks 17 and so assist materially in holding the springs 5 securely in place and preventing them from being pulled out from the hub or even becoming loose therein, after the bolts 13 have been properly tightened.

Each bracket 4 consists of a body member, which has a central passageway therein or is hollow as in the present instance, provided at one end with an integral cross-arm 19 and at the other end with a bolt 20, and further provided with a block 21 into which said bolt 20 is tapped and from which extend two screw-threaded studs 22, and having a pair of longitudinal flanges 23 on each side. The flanges 23 are on opposite sides of the bracket body adjacent to the corners, and the block 21 is located in the beforementioned passageway or the hollow interior of said body and extends in both directions into slots 24 in the sides which are at right-angles to said first-mentioned sides, with the studs 22 projecting from the ends of said block which are in said slots outwardly between the flanges in each pair. The bolt 20 has a fixed collar 25 thereon separated from the head of said bolt by a distance substantially equal to the thickness of the inner end of the bracket body or that part of such body through which said bolt passes, such end or part being slotted at 26 to enable the bolt to be placed in position. The bolt 20 is thus seated in the aforesaid inner end in such a way that it can be rotated but is held against endwise movement. This bolt enters the block 21 at right-angles to the axes of the studs 22, and enters the block body from the inner or free end of the latter as noted. The space between each pair of flanges 23 is equal to the width of the inwardly-directed and extending part which constitutes the outer terminal of each spring unit 5, which terminal is received in such space and in turn receives the stud 22 that is between said flanges, said terminal being perforated for the passage of said stud. A nut 27 is employed on each stud 22 outside of the spring terminal thereon, to bind said terminal securely to the block 21 and against the adjacent side of the bracket, the flanges 23 between which said terminal is received assisting in holding the terminal in position and serving especially to prevent the same from turning on said stud.

The bracket 4 may be fastened to the rim 3 by means of a center bolt 28 and two other bolts 29, the former passing inward through said rim under the tire 6 into threaded engagement with said bracket, and the two latter passing outward through the cross-arm 19 into said rim, or the bracket may be attached to the rim in some other suitable manner and by some other suitable means.

In assembling the members in the wheel in which the inner ends of the spring units 5 abut and are preferably provided with the hooks 9, the hooked ends of each pair of said units are introduced into one of the recesses 11 with the binding-block 17 therein between said units and the associated lug 12, one or more reinforcing or auxiliary springs 10 are introduced, if desired, either between said units and the inner edge of said recess, or on both sides of the hub portions of the units, as in the last view, and the bolt 13 in said lug is screwed up tight, so as to force said block hard against all of springs and securely clamp the latter between the block and the main body of the hub 1. The springs 5 which are made to overlap, as shown in Fig. 3, are secured to the hub in the same way as has just been described. After all of the springs have been tightly wedged or clamped into place through the medium of the bolts 13 and the binding-blocks 17, the face-plate 16 is attached to the hub with the bolts 15.

The brackets 4 number the same as do the lugs 12 or the pairs of spring units 5, and said brackets are so attached to the inner surface of the rim 3 that their inner terminals are adjacent to said lugs. The inwardly-directed and extending terminals of each pair of units 5 are received against opposite faces of a bracket 4, between the flanges 23 on said bracket, and secured by the bolts 27 on the studs 22.

The proper adjustment of the units 5, after they have been fastened to the hub and to the brackets but before the nuts 27 are tightened, is brought about by turning the bolts 20 in one direction or the other to move the blocks 21, to which said units are attached directly, in the slots 24 either nearer to or farther from the inner ends of said brackets, to whatever extent may be necessary and according to the kind of adjustment and tension required. After this adjustment the nuts 27 are set up and the associated parts and members are thereby rendered secure. Thus it is possible to adjust the wheel with great accuracy.

From the foregoing it is plain how easily and quickly changes can be made for repair or other purposes, which is an exceedingly important factor in a wheel of this kind.

Figure 8:
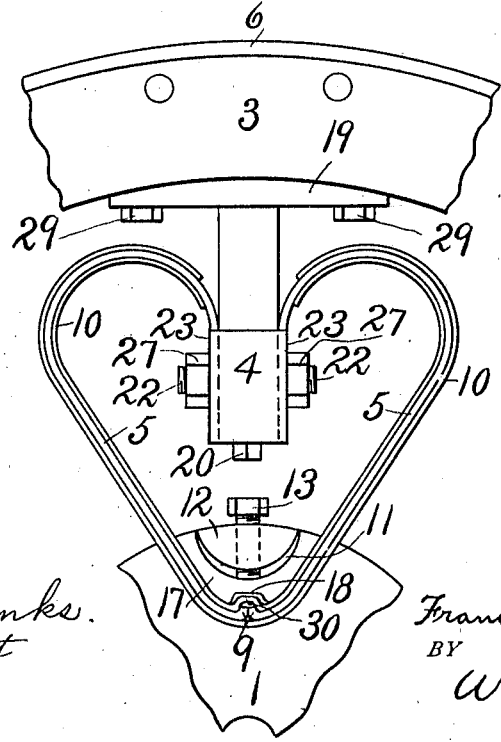

In the Figs. 1 and 2 construction a single auxiliary spring 10 is used and in the Fig. 4 construction three such springs are used with each pair of springs 5 in each case, while in Fig. 6 there are no auxiliary springs. These auxiliary springs may be of any desired length, but when two or more are used with a pair of springs 5, as in Fig. 4, the spring 10 nearer or nearest the center of the hub 1 is generally shorter than the next one, and the latter shorter than the next, provided there be more than two, and so on. As shown in Fig. 8, there are two auxiliary springs 10, one inside and the other outside of the units 5. These springs 10 are longer than the auxiliary springs in the other examples, and they extend on both sides of each unit 5 nearly to the junction which said unit forms with the bracket 4, and constitute excellent reinforcing mediums for the units, as will be readily perceived. The inner auxiliary spring may be bent outward at its apex, as shown at 30, to fit into the indentation 18 in the binding-block 17 for the springs, and to receive the hooked ends 9 of the associated units 5.

In a construction where the inner terminals of the units 5 are carried by the radial center of each recess 11, as in Fig. 3, the overlapping terminals of the units 5 may be depended upon to afford the necessary protection at the hub and to reinforce the main reaches of said units adjacent to the hub, in very much the same way as is done by the springs 10.

The springs 10 greatly strengthen any construction in which they are incorporated and increase its durability by augmenting the structure at the joints formed by the units 5 with the hub or the connections between these members and by stiffening said units at points where additional rigidity is required.

As hereinbefore intimated, and as illustrated in Fig. 7, the spring units 5 may each consist of a plurality of springs instead of a single spring, the construction and arrangement otherwise being the same as in any one of the various other examples herein set forth.

The hub 1 rarely needs to be altered, in any given wheel, only the binding-blocks and not always these, in order to change from abutting units to overlapping units or vice versa, or to add or take away auxiliary springs.

In order to reduce to the minimum, if not eliminate altogether, the possibility of the spring units 5 getting out of shape or breaking at their outer terminals, and for the purpose of permitting of the use of lighter units than might otherwise be practicable, relief-buffers 31 may be supplied, as shown in Fig. 1, to afford cushions or yielding seats for the lobes of said units, which seats receive said lobes whenever the approximate maximum compression of said units occurs. The relief-buffers 31 are bolted at 32 to the inside of the rim 3 between the brackets 4, and each of said buffers has two curved arms 33 which extend in opposite directions to present themselves in proper receiving relation to or position for the two adjacent lobes of two adjacent units 5. The arms 33 should extend nearly to the brackets 4. I prefer to so arrange the arms 33 that there shall be a space between them and the units 5, excepting at such times as the units undergo practically their full compression. The shock of contact at these times is absorbed by the relief-buffers, and the needed extra support for the units 5 at and adjacent to the brackets 4 is afforded. The relief-buffers can be used with any of the spring units and with any of the auxiliary or reinforcing members for the latter. In some cases, especially when the spring units are quite heavy, the relief-buffers may not be required and will not be provided.

There should be sufficient clearance between the heads of adjacent bolts 13 and 20 to avoid contact under all reasonable conditions of the wheel, so, too, in regard to the relief-buffer arms 33, or the units 5 when the relief-buffers 31 are not used, and the heads of the bolts 29; furthermore, the units 5 in adjacent pairs, and their auxiliary springs 10 when present, should be sufficiently far apart not to contact with each other when normal conditions prevail.

The brackets 4 can be used for various kinds of springs.

Various modifications and changes may be made in the construction of my wheel and in the arrangement of its parts without departing from the nature of my invention.

What I claim as my invention, and desire to secure by Letters Patent, is—

1. In a spring wheel, a recessed hub having a plurality of lugs, the recesses in such hub each being bowed, a rim provided with inwardly projecting members, a plurality of pairs of spring units arranged so that each pair assumes an approximately heart-shaped outline or configuration, means comprising binding blocks receivable in said recesses and bolts tapped into said lugs to engage said blocks to secure the inner terminal portions of said units in said recesses, and means to attach the outer terminal portions of said units to said inwardly projecting members.

2. In a spring wheel, a hub having a plurality of bowed recesses opening through one face and the periphery of said hub and forming a plurality of lugs thereon, binding-blocks receivable in said recesses, bolts tapped into said lugs and arranged to bear against the concave edges of said blocks, spring units adapted to have their inner terminal portions received in said recesses, between the body of the hub and the binding-blocks, and to be clamped therein by said blocks and bolts, and attaching means for the outer terminal portions of said units.

3. In a spring wheel, a hub having a plurality of recesses opening through one face and the periphery thereof and forming a plurality of lugs thereon, binding-blocks in said recesses, bolts tapped into said lugs and arranged to bear against said blocks, a rim, spring-attaching means carried by said rim, spring units adapted to have their outer terminal portions connected with such attaching means and their inner terminal portions received in said recesses, between the body of the hub and the binding-blocks, and clamped therein by said blocks and bolts, and reinforcing or auxiliary springs for said units, said reinforcing or auxiliary springs also being adapted to be received and clamped in the recesses with the aforesaid inner terminal portions of said units.

4. In a spring wheel, a hub having a plurality of recesses opening through one face and the periphery thereof and forming a plurality of lugs thereon, binding-blocks for springs in said recesses, bolts tapped into said lugs and arranged to bear against said blocks, springs clamped in said recesses by said blocks and bolts, and a face-plate to cover the open sides of the recesses.

5. The combination, in a spring wheel, with a hub provided with attaching means for the inner terminal portions of springs, and a plurality of springs fastened by such means to said hub, of a rim, a plurality of brackets supported from said rim, sliding members carried by said brackets and provided with receiving members for said springs, and means also carried by said brackets to adjust said sliding members.

6. A rim bracket for the attachment of the outer terminal portions of springs, in a spring wheel, comprising a slotted body, a block mounted to reciprocate longitudinally in said body and provided with laterally-extending spring-receiving studs, and an actuating member for said block, mounted in said bracket.

7. A rim bracket for the attachment of the outer terminal portions of springs, in a spring wheel, consisting of a slotted body having side flanges which are adapted to receive between them the aforesaid portions of springs, a block mounted to reciprocate longitudinally in said body and provided with laterally-extending spring- and nut-receiving studs which project through the slots in said body between said flanges, and a non-reciprocating bolt mounted in said bracket in threaded engagement with said block, the axis of said block being at right-angles to the axes of said studs.

8. A spring wheel comprising a hub, a rim provided with inwardly-projecting members, spring units arranged in heart-shaped formation in the wheel, means to attach the inner terminal portions of said units to said hub, means to attach the outer terminal portions of said units to said inwardly-projecting members with the lobes of such heart-shaped units clear of said rim, and relief-buffers mounted in the wheel between said rim and said lobes and in supporting relation to the latter.

9. A spring wheel comprising a hub, a rim provided with inwardly-projecting members, a plurality of spring units arranged in heart-shaped formation in the wheel, means to attach the inner terminal portions of said units to said hub, means to attach the outer terminal portions of said units to said inwardly-projecting members, and relief-buffers mounted in the wheel intermediate of said inwardly-projecting members and each having yielding arms which extend in opposite directions to constitute seats for the lobes of said heart-shaped units.

FRANCIS J. MILLEA.

Witnesses:
F. A. CUTTER,
JOHN E. STANNARD.